United States Patent
Chen et al.

(10) Patent No.: US 12,073,633 B2
(45) Date of Patent: Aug. 27, 2024

(54) SYSTEMS AND METHODS FOR DETECTING TRAFFIC LIGHTS OF DRIVING LANES USING A CAMERA AND MULTIPLE MODELS

(71) Applicant: Toyota Research Institute, Inc., Los Altos, CA (US)

(72) Inventors: Kun-Hsin Chen, San Francisco, CA (US); Kuan-Hui Lee, San Jose, CA (US); Chao Fang, Sunnyvale, CA (US); Charles Christopher Ochoa, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 152 days.

(21) Appl. No.: 17/726,939

(22) Filed: Apr. 22, 2022

(65) Prior Publication Data
US 2023/0343109 A1  Oct. 26, 2023

(51) Int. Cl.
*G06V 20/58* (2022.01)
*G06V 10/56* (2022.01)
*G06V 20/56* (2022.01)

(52) U.S. Cl.
CPC ............ *G06V 20/584* (2022.01); *G06V 10/56* (2022.01); *G06V 20/588* (2022.01)

(58) Field of Classification Search
CPC .... G06V 20/584; G06V 10/56; G06V 20/588; G06V 20/582
(Continued)

(56) References Cited

U.S. PATENT DOCUMENTS

2015/0210278 A1   7/2015  Ben Shalom et al.
2019/0332875 A1*  10/2019  Vallespi-Gonzalez ...................... G05D 1/0088

(Continued)

FOREIGN PATENT DOCUMENTS

CN   108875608 A   11/2018

OTHER PUBLICATIONS

Langenberg et al., "Deep Metadata Fusion for Traffic Light to Lane Assignment" in IEEE Robotics and Automation Letters, vol. 4, No. 2, Apr. 2019, pp. 973-980.
(Continued)

*Primary Examiner* — Gims S Philippe
(74) *Attorney, Agent, or Firm* — Christopher G. Darrow; Darrow Mustafa PC

(57) ABSTRACT

System, methods, and other embodiments described herein relate to improving the detection of traffic lights associated with a driving lane using a camera instead of map data. In one embodiment, a method includes estimating, from an image using a first model, depth and orientation information of traffic lights relative to a driving lane of a vehicle. The method also includes computing, using a second model, relevancy scores for the traffic lights according to geometric inferences between the depth and the orientation information. The method also includes assigning, using the second model, a primary relevancy score for a light of the traffic lights associated with the driving lane according to the depth and the orientation information. The method also includes executing a control task by the vehicle according to the primary relevancy score and a state confidence, computed by the first model, for the light.

20 Claims, 5 Drawing Sheets

(58) Field of Classification Search
USPC .......................................................... 348/148
See application file for complete search history.

(56) References Cited

U.S. PATENT DOCUMENTS

| | | | |
|---|---|---|---|
| 2019/0392706 A1* | 12/2019 | Max | G06V 20/584 |
| 2020/0126408 A1* | 4/2020 | Gigengack | B60W 30/12 |
| 2021/0146952 A1 | 5/2021 | Vora et al. | |
| 2022/0048535 A1* | 2/2022 | Niendorf | B60W 60/0011 |
| 2022/0114375 A1* | 4/2022 | Chen | G06V 10/774 |
| 2022/0114888 A1* | 4/2022 | Napanda | G06V 10/25 |

OTHER PUBLICATIONS

Guizilini et al., "Semantically-Guided Representation Learning for Self-Supervised Monocular Depth," arXiv:2002.12319, ICLR 2020, pp. 1-14.

Keqi Wei, "Multiple Traffic Light Recognition System Based on a Monocular Camera," Jun. 27, 2017,.

Chen et al., "Accurate and Reliable Detection of Traffic Lights Using Multiclass Learning and Multiobject Tracking," in IEEE Intelligent Transportation Systems Magazine, vol. 8, No. 4, 2016, pp. 28-42.

Liu et al., "Real-time Signal Light Detection based on Yolov5 for Railway," IOP Conference Series. Earth and Environmental Science, vol. 769, issue 4, May 2021, pp. 1-12.

* cited by examiner

SYSTEMS AND METHODS FOR DETECTING TRAFFIC LIGHTS OF DRIVING LANES USING A CAMERA AND MULTIPLE MODELS

TECHNICAL FIELD

The subject matter described herein relates, in general, to detecting traffic lights, and, more particularly, to detecting traffic lights associated with a driving lane using a camera instead of map data.

BACKGROUND

Vehicle systems use data from positioning and other sensors for performing guidance and other tasks. Guidance operations may involve various tasks involving a navigation system coordinating with other systems that assist a vehicle, such as an automated driving system (ADS). For example, vehicle systems use map and sensor data to guide a vehicle through an intersection. As part of the guidance, a machine learning (ML) model for the ADS may help assist with driving tasks through the intersection and similar risky scenarios by perceiving objects. Assistance from the ADS can help improve safety and comfort for an operator.

In various implementations, the vehicle systems use high-definition (HD) map data when assisting navigation through intersections. HD map data can increase the accuracy of tasks, thereby improving safety. However, ADS and other systems relying on HD map data increase computational costs from added complexity. Furthermore, HD map data may be unavailable and stale in certain geographic areas. This can create difficulties when assistance from the vehicle systems is unavailable, particularly for intersections.

SUMMARY

In one embodiment, example systems and methods relate to a manner of detecting traffic lights associated with a driving lane using a camera instead of map data. In various implementations, systems detecting traffic lights to navigate through an intersection utilize map and sensor data. The reliance on map data, particularly high-definition (HD) map data, can increase computational costs for navigation and other vehicle systems from increased complexity. The unavailability of map data in certain regions also impacts safety for vehicle systems relying on the data for providing assistance. Therefore, in one embodiment, a detection system processes an image from a camera (e.g., monocular camera) in a first model (e.g., a neural network, an encoder-decoder architecture, etc.) for estimating characteristics (e.g., depth, location, color, etc.) of traffic lights that may be associated with a driving lane. In particular, the first model may estimate depth and orientation information for traffic lights (e.g., multi-lamp signals, railroad signals, crosswalk signals, etc.) within the image instead of relying on map data. A second model may aggregate the depth and orientation information to accurately compute relevancy scores for the traffic lights using geometric processing. Here, the relevancy scores may indicate which traffic lights in the image are most relevant to the vehicle for given driving lanes. In this way, vehicle systems can reliably execute tasks involving the traffic lights along the driving lane using the relevancy scores. Accordingly, the detection system processes an image and uses multiple models (e.g., a two-stage model) for accurately scoring relevant traffic lights instead of using map data, thereby reducing complexity and increasing assistance availability.

In one embodiment, a detection system for detecting traffic lights associated with a driving lane using a camera instead of map data is disclosed. The detection system includes a processor and memory storing instructions that, when executed by the processor, cause the processor to estimate, from an image using a first model, depth and orientation information of the traffic lights relative to a driving lane of a vehicle. The instructions also include instructions to compute, using a second model, relevancy scores for the traffic lights according to geometric inferences between the depth and the orientation information. The instructions also include instructions to assign, using the second model, a primary relevancy score for a light of the traffic lights associated with the driving lane according to the depth and the orientation information. The instructions also include instructions to execute a control task by the vehicle according to the primary relevancy score and a state confidence, computed by the first model, for the light.

In one embodiment, a non-transitory computer-readable medium for detecting traffic lights associated with a driving lane using a camera instead of map data and including instructions that when executed by a processor cause the processor to perform one or more functions is disclosed. The instructions include instructions to estimate, from an image using a first model, depth and orientation information of traffic lights relative to a driving lane of a vehicle. The instructions also include instructions to compute, using a second model, relevancy scores for the traffic lights according to geometric inferences between the depth and the orientation information. The instructions also include instructions to assign, using the second model, a primary relevancy score for a light of the traffic lights associated with the driving lane according to the depth and the orientation information. The instructions also include instructions to execute a control task by the vehicle according to the primary relevance score and a state confidence, computed by the first model, for the light.

In one embodiment, a method for detecting traffic lights associated with a driving lane using a camera instead of map data is disclosed. In one embodiment, the method includes estimating, from an image using a first model, depth and orientation information of traffic lights relative to a driving lane of a vehicle. The method also includes computing, using a second model, relevancy scores for the traffic lights according to geometric inferences between the depth and the orientation information. The method also includes assigning, using the second model, a primary relevancy score for a light of the traffic lights associated with the driving lane according to the depth and the orientation information. The method also includes executing a control task by the vehicle according to the primary relevancy score and a state confidence, computed by the first model, for the light.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the detection of traffic lights associated with a driving lane using a camera instead of map data are disclosed herein. In various implementations, detecting traffic lights to navigate through an intersection using map and sensor data can encounter difficulties. For instance, systems that use high-definition (HD) map data for associating a traffic light, regardless of state, to a driving lane encounter significant computational costs from complex structures that form HD map data. Furthermore, map data may be available in certain regions. Vehicle systems operating in regions where map data is unavailable or stale impacts safety for driver assistance systems that rely on map data. Therefore, in one embodiment, a detection system uses a first model (e.g., neural network (NN), perceptron, convolutional NN (CNN), etc.) to estimate depth and orientation information of traffic lights from an image (e.g., a monocular image) taken by a vehicle-based camera. Here, the depth and orientation information give the detection system insight into the relative position and geometries of the traffic lights (e.g., multi-lamp signals, railroad signals, crosswalk signals, etc.) for a driving lane substantially independent of map data. For example, the geometries can indicate an angle between the traffic lights and the vehicle relative to the driving lane. Regarding further processing, the detection system uses a second model (e.g., perceptron, CNN, etc.) that computes relevancy scores for the traffic lights in association with the driving lane. This may involve the second model forming geometric inferences between the depth and the orientation information. Furthermore, the detection system uses the second model to predict and assign a primary relevance score for a traffic light most likely associated with the driving lane using the depth and the orientation information.

Moreover, a vehicle system may execute a control using the primary relevance score and a state confidence, computed by the first model, for the relevant traffic light. Here, the state confidence indicates probabilities of a color and a shape associated with the traffic light. In one approach, the detection system assigns the primary relevance score using limited map data associated with the driving lane or the driving scenario (e.g., intersection crossing, vehicle-following, etc.). Accordingly, a detection system uses multi-stage modeling to derive geometric relations between traffic lights and a driving lane and compute a relevancy score using predictions independent of map data, thereby improving accessibility and robustness.

Figure 1:
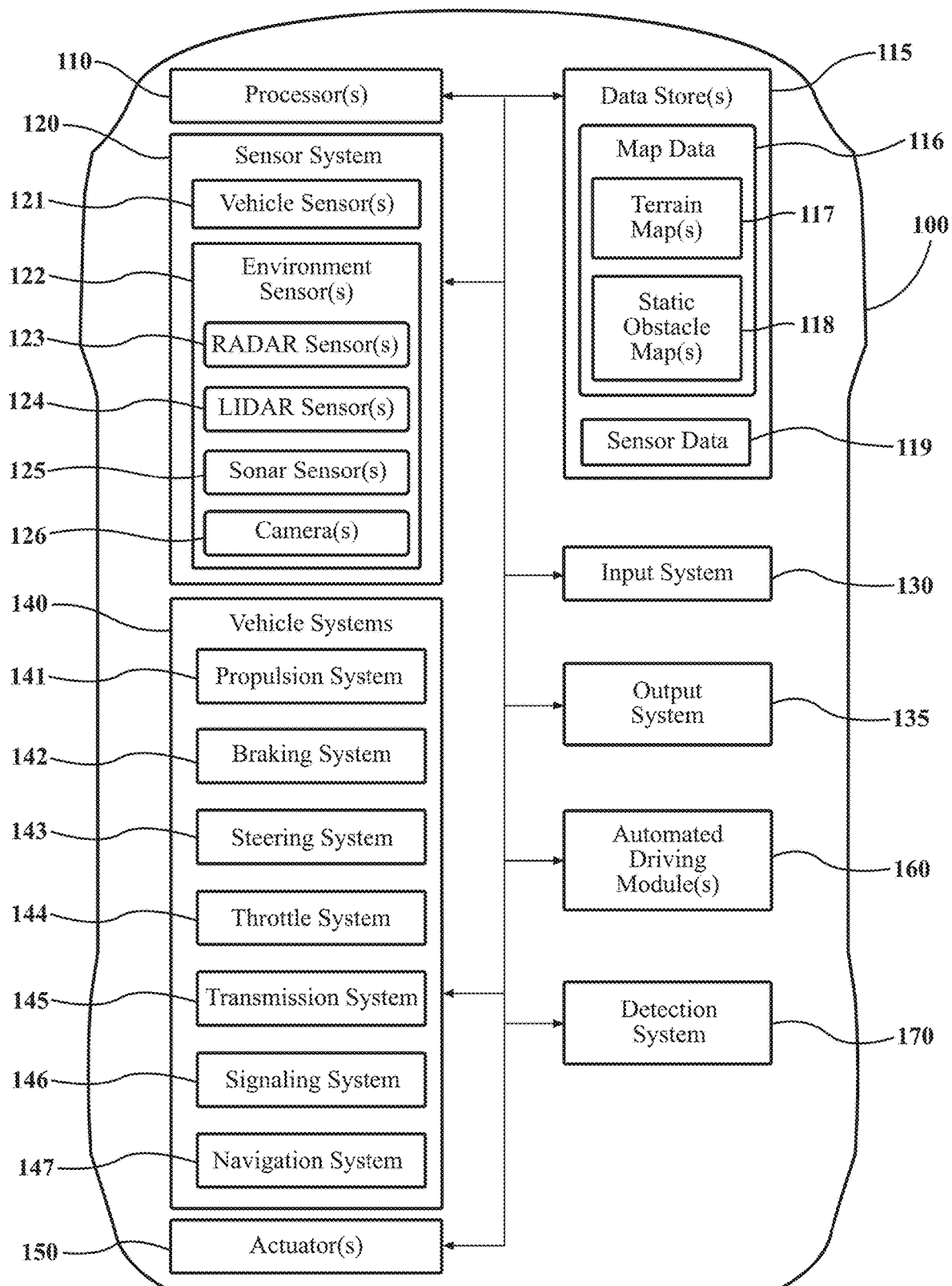
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, a detection system uses road-side units (RSU), consumer electronics (CE), mobile devices, robots, drones, and so on that benefit from the functionality discussed herein associated with improving the detection of traffic lights corresponding to a driving lane using a camera instead of map data.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to improving the detection of traffic lights associated with a driving lane using a camera instead of map data. As will be discussed in greater detail subsequently, the detection system 170, in various embodiments, is implemented partially within the vehicle 100, and as a cloud-based service. For example, in one approach, functionality associated with at least one module of the detection system 170 is implemented within the vehicle 100 while further functionality is implemented within a cloud-based computing system.

Figure 2:
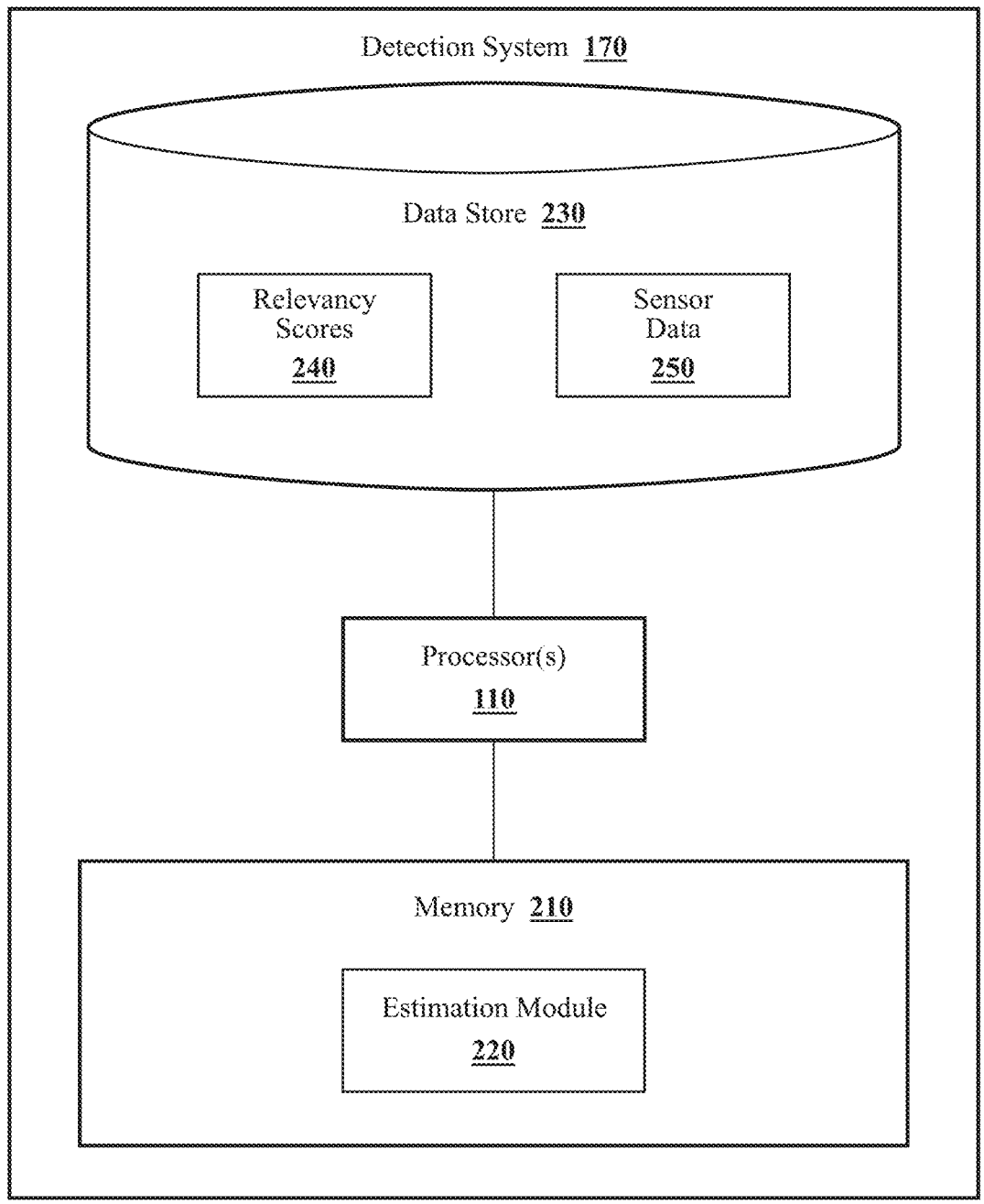
FIG. 2 illustrates one embodiment of a detection system that is associated with identifying traffic lights associated with a driving lane using a camera instead of map data.

With reference to FIG. 2, one embodiment of the detection system 170 of FIG. 1 is further illustrated. The detection system 170 is shown as including a processor(s) 110 from the vehicle 100 of FIG. 1. Accordingly, the processor(s) 110 may be a part of the detection system 170, the detection system 170 may include a separate processor from the processor(s) 110 of the vehicle 100, or the detection system 170 may access the processor(s) 110 through a data bus or another communication path. In one embodiment, the detection system 170 includes a memory 210 that stores an estimation module 220. The memory 210 is a random-access memory (RAM), a read-only memory (ROM), a hard-disk drive, a flash memory, or other suitable memory for storing the estimation module 220. The estimation module 220 is, for example, computer-readable instructions that when executed by the processor(s) 110 cause the processor(s) 110 to perform the various functions disclosed herein.

The detection system 170 as illustrated in FIG. 2 is generally an abstracted form of the detection system 170. Furthermore, the estimation module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the estimation module 220, in one embodiment, acquires the sensor data 250 that includes at least camera images (e.g., monocular images). In further arrangements, the estimation module 220 acquires the sensor data 250 from further sensors such as radar sensors 123, LIDAR sensors 124, and other sensors as may be suitable for identifying and locating objects (e.g., vehicles).

Accordingly, the estimation module 220, in one embodiment, controls the respective sensors to provide the data inputs in the form of the sensor data 250. Additionally, while the estimation module 220 is discussed as controlling the various sensors to provide the sensor data 250, in one or more embodiments, the estimation module 220 can employ other techniques to acquire the sensor data 250 that are either active or passive. Moreover, the estimation module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the detection system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the estimation module in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes relevancy scores 240. These scores may be an index (e.g., 1-10), a percentage, a scale (0-1), and so on that the detection system 170 computes. The relevancy score can indicate the importance of an upcoming traffic light (e.g., multi-lamp signals, railroad signals, crosswalk signals, etc.) detected within an image to the driving lane of a vehicle. In one approach, the traffic light is scored entirely rather than by bulb. For instance, an entire traffic light may include the bulb housing, support pole, support cable, and so on associated with the traffic light structure. Furthermore, the relevancy score may be aggregated so that the score reflects a number (e.g., 2, 3, etc.) of traffic lights relevant to the driving lane.

In various implementations, the estimation module 220 is further configured to perform additional tasks beyond controlling the respective sensors to acquire and provide the sensor data 250. For example, the estimation module 220 includes instructions that cause the processor(s) 110 to estimate from an image, such as a monocular image taken by one of the cameras 126, depth and orientation information of traffic lights using a first model (e.g., NN, perceptron, CNN, etc.). Such estimates are relative to a driving lane of the vehicle 100 (e.g., an ego vehicle) so that the detection system 170 identifies the most relevant traffic lights. In various implementations, the orientation information is a facing degree of a camera or the vehicle 100 relative to one or more traffic lights. For instance, as explained below, an orientation of 0 or 90 degrees reflects that one or more traffic lights are directly associated with the current driving lane for the vehicle 100. On the contrary, an orientation of 45 or 135 degrees may reflect that one or more traffic lights are associated with other lanes and less relevant to the vehicle 100.

In one approach, the estimates also include sizing information having coordinates that indicate x-y position, height (h), and width (w) geometries of the traffic lights within the image, such as relative to image pixels. For example, the h and w are dimensions of a bounding box encompassing the traffic lights or other objects. As explained below, the depth, the orientation information, and the size information may be used by the detection system 170 to determine the most relevant traffic lights for the vehicle 100.

Moreover, a second model (e.g., perceptron, CNN, etc.) can compute relevancy scores for one or more traffic lights associated with a driving lane from geometric inferences between the depth, the orientation, and the size information. For instance, a potential traffic light 0 degrees and 20×5 pixels at a depth ahead of an ado vehicle to the vehicle 100 is more relevant than one 45 degrees and 30×5 pixels. In one approach, the detection system 170 factors motion estimates from other vehicle systems when computing relevancy scores. For example, the traffic light at 45 degrees is more relevant than a different traffic light at 0 degrees when a lane-change maneuver is likely by the ADS for the vehicle 100.

In addition, the detection system 170 may assign a primary relevancy score for a light of the traffic lights associated with the driving lane using the second model with limited assistance from map data. In one approach, the primary relevancy score is inferred from the depth and the orientation information. In this way, the detection system 170 associates a primary light for a driving lane and outputs a related confidence score independent of map data, thereby reducing computation costs. The output may also include a location and a color for the primary light associated with the confidence score specific to the driving lane. For additional insight, the detection system 170 detects a secondary relevancy score for another light in an adjacent lane to the vehicle 100 for advanced tasks, such as a lane crossing by an ADS.

Figure 3:
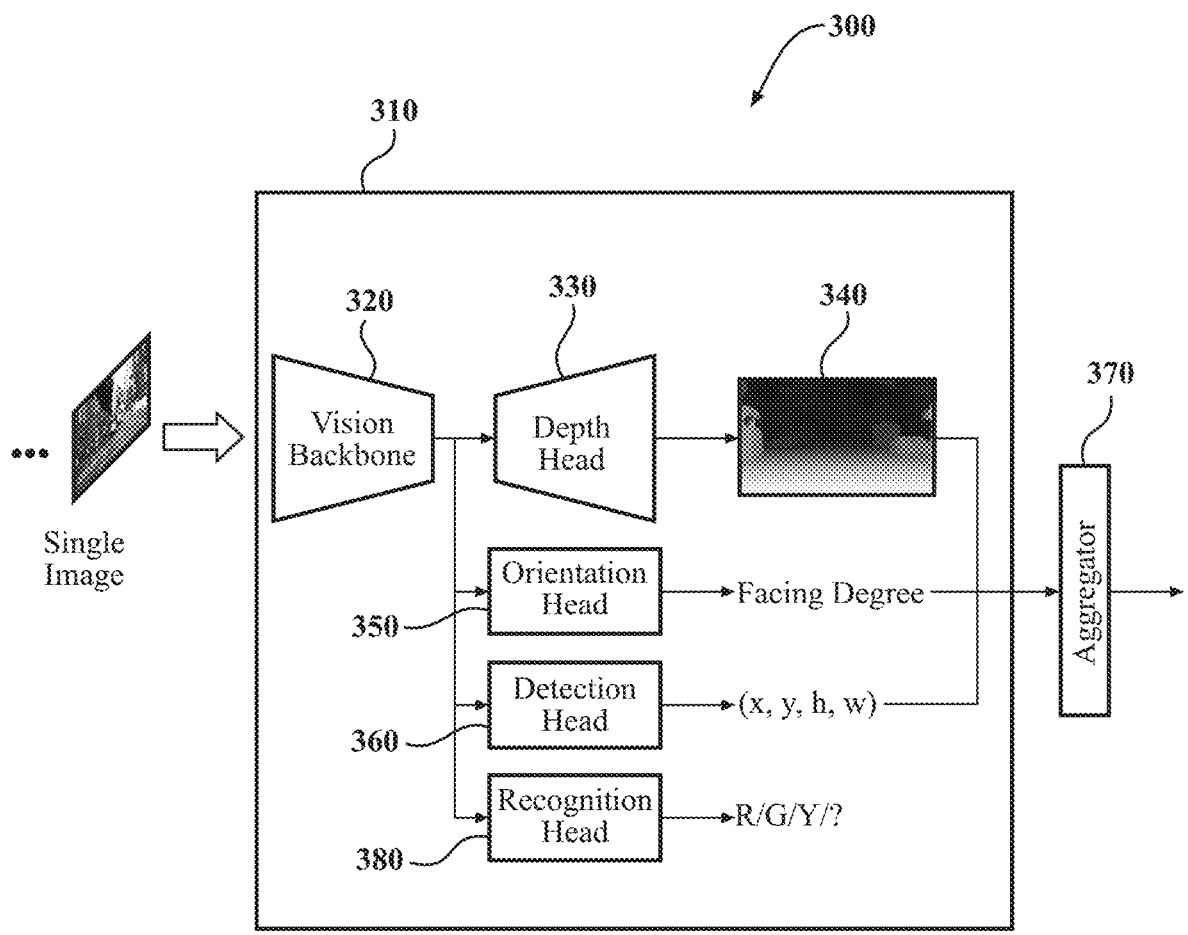
FIG. 3 illustrates one embodiment of the detection system of FIG. 2 using an encoder and decoders that detect through probabilistic formulations traffic lights associated with the driving lane.

Now turning to FIG. 3, one embodiment of the detection system 170 of FIG. 2 using an encoder and decoders 300 that detect through probabilistic formulations traffic lights associated with a driving lane is illustrated. Here, the detection system 170 identifies traffic lights using images from a camera substantially independent of map data. In particular, the first model 310 (e.g., NN, perceptron, CNN, etc.) includes an encoder and decoders to unify the detection of traffic lights, such as by decoding data from a common encoder to predict depth, orientation, size, and recognition in parallel within the first model. In this way, the detection system 170 improves efficiency and reduces computational costs.

Moreover, an encoder 320 may be a vision backbone that detects object features or attributes within an image taken from a single view, such as by one monocular camera. The depth head 330 may decode the features and output the depth map 340 using features from the encoder 320. For example, the depth map 340 is a heat map representing distance and can be color-coded according to object type (e.g., vehicle, pedestrian, illuminated device, etc.).

Regarding the orientation head 350, this decoder may process the output of the encoder 320 to estimate a degree (e.g., facing degree) between the vehicle 100 and objects (e.g., traffic lights) relative to a driving lane. As previously explained, a facing degree can represent a geometric measurement between a camera or the vehicle 100 in a driving lane relative to one or more traffic lights. For instance, an orientation of 0 or 90 degrees reflects that one or more traffic lights are directly associated with the current driving lane for the vehicle 100. On the contrary, an orientation of 135 or 45 degrees may reflect that one or more traffic lights are associated with other lanes and less relevant to the vehicle 100.

In one approach, the first model 310 includes the detection head 360 that locates a traffic light and computes coordinates indicating x-y position, h, and w geometries within an image, such as relative to pixels. For example, the h and w geometries are dimensions of a bounding box at position x-y encompassing a traffic light unit. Furthermore, these locations may be for an entire traffic light instead of individual bulbs for reducing computational loads to the detection system 170 and/or the estimation module 220. For instance, an entire traffic light includes the bulb housing, support pole, support cable, and so on associated with the traffic light structure.

Regarding additional detection tasks, the first model 310 includes the recognition head 380 that determines states of potential traffic lights. For example, the recognition head 380 decodes the output of encoder 320 and outputs red, green, yellow, symbol (e.g., arrow), and so on information. An associated confidence score for potential traffic lights within the image can also form part of the information. Thus, the detection system 170 outputs a state confidence indicating probabilities of a color and a shape for a light cover, bulb, housing, and so on associated with traffic lights.

In various implementations, the aggregator 370 is a second model that processes outputs from the depth head 330, the orientation head 350, and the detection head 360. For instance, the second model is a subnetwork (e.g., neural network, heuristic method, etc.) that outputs relevant scores for one or more traffic lights associated with a driving lane (e.g., ego lane). A score can indicate probabilities or measures relating a traffic light to a driving lane. For example, an image (e.g., monocular image) has two traffic lights, where the first traffic light has a 0.9 score and the second traffic light 0.1 score from the relevancy scores 240. As such, the first traffic light may be most relevant for the vehicle 100. Here, the aggregator 370 reliably scores traffic lights by understanding the geometries of the traffic scene associated with the driving lane from the depth, orientation, and detection information.

Furthermore, the detection system 170 may communicate the scores outputted from the aggregator 370 and information from the recognition head 380 to downstream processes that perform tasks such as object detection, object tracking, and motion planning. For example, a perception system tracking a vehicle perpendicular to the vehicle 100 near an intersection infers a speed reduction using the detection system 170. Accordingly, the detection system 170 may compute that the primary relevancy score is 0.8, state green, and state confidence 0.9 for a traffic light. In other words, the vehicle approaching the intersection will reduce speed and stop since the vehicle 100 is likely traveling towards the intersection with a green light, thereby reducing collision risk.

Figure 4:
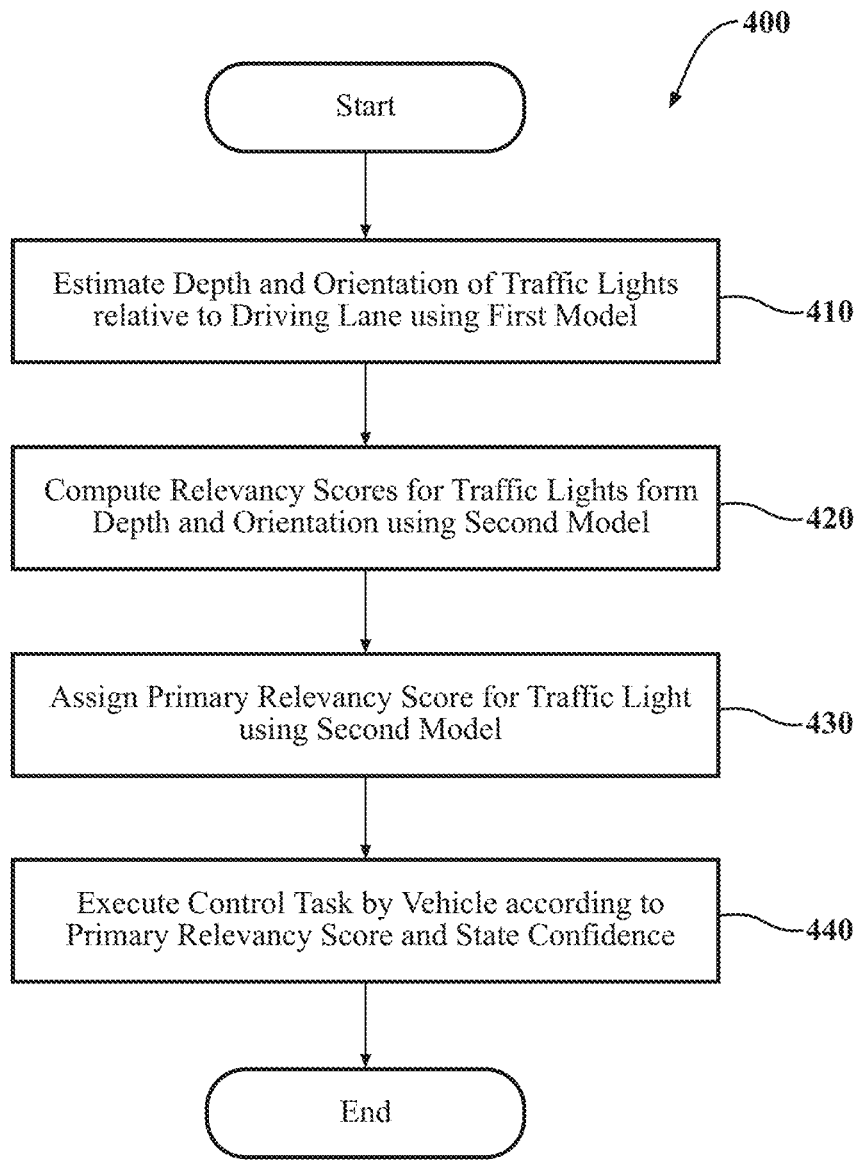
FIG. 4 illustrates one embodiment of a method that is associated with identifying traffic lights for the driving lane by computing relevancy scores.

Turning now to FIG. 4, a flowchart of a method 400 that is associated with improving the detection of traffic lights associated with a driving lane using a camera instead of map data is illustrated. Method 400 will be discussed from the perspective of the detection system 170 of FIGS. 1 and 2. While method 400 is discussed in combination with the detection system 170, it should be appreciated that the method 400 is not limited to being implemented within the detection system 170 but is instead one example of a system that may implement the method 400.

At 410, the detection system 170 estimates depth and orientation of traffic lights (e.g., multi-lamp signals, railroad signals, crosswalk signals, etc.) relative to a driving lane for the vehicle 100 using a first model (e.g., NN, perceptron, CNN, etc.). As previously explained, the detection system 170 estimates from an image (e.g., a monocular image) depth and orientation information of traffic lights relative to a driving lane of the vehicle 100 (e.g., an ego vehicle) using the first model for relevance. Here, depth information can be a depth map of various objects (e.g., vehicle, pedestrian, illuminated device, etc.). Furthermore, the orientation information may be a facing degree of a camera or the vehicle 100 relative to one or more traffic lights. For instance, an orientation of 0 or 90 degrees reflects that one or more traffic lights are directly associated with the current driving lane for the vehicle 100. On the contrary, an orientation of 45 or 135 degrees may reflect traffic lights associated with other lanes that are less relevant to the vehicle 100.

Regarding relevancy, at 420 the detection system 170 computes relevancy scores for traffic lights from the depth and the orientation information using a second model (e.g., perceptron, CNN, etc.). Here, the relevancy scores can be computed for traffic lights associated with a driving lane from geometric predictions and inferences between the depth and the orientation information. For instance, a traffic light at 0 degrees to the vehicle 100 is more relevant than at 45 degrees. In one approach, the detection system 170 factors motion estimates from other vehicle systems when computing relevancy scores. For example, the traffic light at 45 degrees is more relevant than a different traffic light at 0 degrees when a lane change is planned by the ADS for the vehicle 100.

At 430, the detection system 170 assigns a primary relevancy score for a traffic light according to depth and orientation using the second model. In particular, the detection system 170 associates the traffic light with the driving lane with limited assistance from map data. In one approach, the primary relevancy score is associated with the depth and the orientation information as part of geometric computations. For additional insight, the detection system 170 detects a secondary relevancy score for another light in an adjacent lane to the vehicle 100 for advanced tasks, such as a lane crossing. In this way, the detection system 170 associates a primary light for a driving lane and outputs related confidence scores independent of map data, thereby reducing computation costs.

At 440, a system of the vehicle 100 executes a control task according to the primary relevancy score and a state confidence. Here, the first model determines states of potential traffic lights and outputs red, green, yellow, symbol (e.g., arrow), and so on information including an associated confidence score for potential traffic lights within the image. As such, the detection system 170 outputs a state confidence indicating probabilities of a color and a shape of a light cover, bulb, housing, and so on associated with the traffic lights for other tasks.

Moreover, a control task may involve object detection, object tracking, and motion planning. For example, a perception system monitoring a cross-track scenario near an intersection for the vehicle 100 infers using the detection system 170 that another vehicle will reduce speed. Here, the detection system 170 can compute that the primary relevancy score is 0.8, state green, and state confidence 0.9 for a traffic light. In other words, the crossing vehicle may reduce speed and stop since the vehicle 100 is likely traveling towards an intersection with a green light. Accordingly, the detection system 170 improves efficiency and reduces computational costs through the first model unifying detection of traffic lights and the second model computing relevancy.

Figure 5:
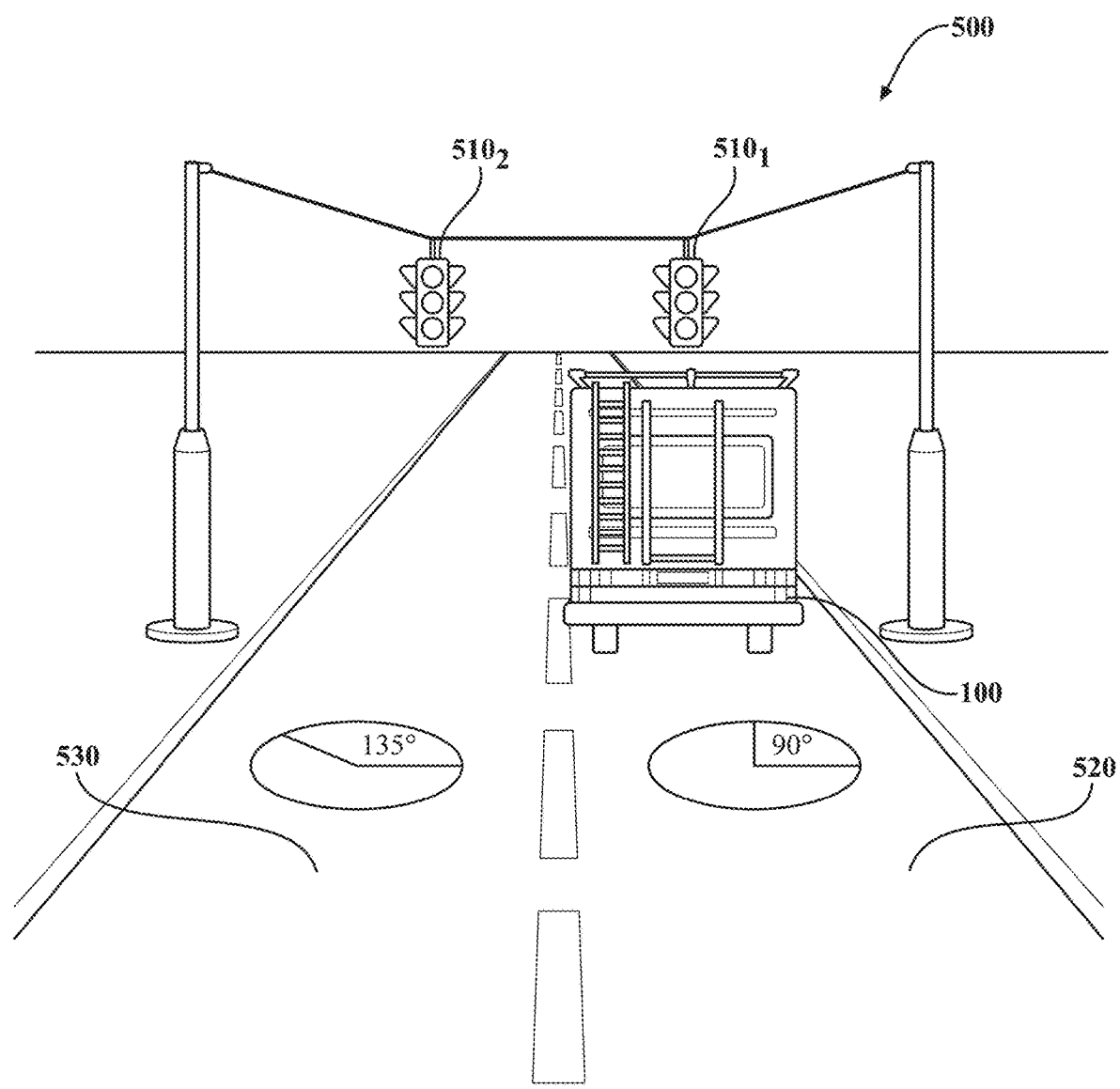
FIG. 5 illustrates an example of detected orientations for traffic lights relative to the driving lane.

Now turning to FIG. 5, an example 500 of detected orientations for traffic lights relative to the driving lane is illustrated. Here, the vehicle 100 is approaching the traffic lights $510_1$ and $510_2$ from the driving lane 520. The detection system 170 may use the first model to estimate from an image that the traffic light $510_1$ is 90 degrees relative to a unit circle for the vehicle 100 and green. Similarly, the orientation computation for the traffic light $510_2$ is 135 degrees. As such, the traffic light $510_1$ may be scored as more relevant than the traffic light $510_2$ by the second model due to orientation or facing degrees. In one approach, the detection system 170 detects the traffic light $510_2$ at 0 degrees and $510_1$ at 45 degrees when the vehicle 100 approaches from the driving lane 530. Accordingly, the traffic light $510_2$ may be scored as more relevant than the traffic light $510_1$ in this driving scenario when traveling on the driving lane 530.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system for identifying traffic lights comprising:
    a processor; and
    a memory storing instructions that, when executed by the processor, cause the processor to:
        estimate, from an image using a first model, depth, orientation information, and location information of the traffic lights relative to a driving lane of a vehicle within a traffic scene;
        compute, using a second model, relevancy scores for the traffic lights according to geometric inferences between the depth, the orientation information, and the location information, and the geometric inferences represent the orientation information as an angular relationship between the vehicle within the driving lane and the traffic lights;
        assign, using the second model, a primary relevancy score from the relevancy scores for a light of the traffic lights associated with the driving lane according to the depth and the orientation information; and
        execute a control task by the vehicle according to the primary relevancy score and a state confidence, computed by the first model, for the light.

2. The detection system of claim 1, wherein the instructions to assign the primary relevancy score further include instructions to assign, using the second model, a secondary relevancy score for another light of the traffic lights in an adjacent lane to the vehicle substantially independent of map data.

3. The detection system of claim 1, wherein the state confidence indicates probabilities of a color and a shape for the light of the traffic lights.

4. The detection system of claim 1, wherein the instructions to estimate the depth further include instructions to determine, using the first model, a geometric representation of the traffic scene with the image, the depth, the orientation, and the location information independent of map data, and the state confidence represents probabilities for characteristics associated with the traffic lights.

5. The detection system of claim 4, wherein the angular relationship is between the light and the vehicle relative to an adjacent lane.

6. The detection system of claim 1, wherein the primary relevancy score is assigned substantially independent of map data for the traffic lights and the driving lane.

7. The detection system of claim 1, wherein the image is captured by a monocular camera of a single view for the traffic lights.

8. A non-transitory computer-readable medium comprising:
instructions that when executed by a processor cause the processor to:
estimate, from an image using a first model, depth, orientation information, and location information of traffic lights relative to a driving lane of a vehicle within a traffic scene;
compute, using a second model, relevancy scores for the traffic lights according to geometric inferences between the depth, the orientation information, and the location information, and the geometric inferences represent the orientation information as an angular relationship between the vehicle within the driving lane and the traffic lights;
assign, using the second model, a primary relevancy score from the relevancy scores for a light of the traffic lights associated with the driving lane according to the depth and the orientation information; and
execute a control task by the vehicle according to the primary relevance score and a state confidence, computed by the first model, for the light.

9. The non-transitory computer-readable medium of claim 8, wherein the instructions to assign the primary relevancy score further include instructions to assign, using the second model, a secondary relevancy score for another light of the traffic lights in an adjacent lane to the vehicle substantially independent of map data.

10. The non-transitory computer-readable medium of claim 8, wherein the state confidence indicates probabilities of a color and a shape for the light of the traffic lights.

11. The non-transitory computer-readable medium of claim 8, wherein the instructions to estimate the depth further include instructions to determine, using the first model, a geometric representation of the traffic scene with the image, the depth, the orientation, and the location information independent of map data, and the state confidence represents probabilities for characteristics associated with the traffic lights.

12. The non-transitory computer-readable medium of claim 11, wherein the angular relationship is between the light and the vehicle relative to an adjacent lane.

13. The non-transitory computer-readable medium of claim 8, the primary relevancy score is assigned substantially independent of map data for the traffic lights and the driving lane.

14. A method comprising:
estimating, from an image using a first model, depth, orientation information, and location information of traffic lights relative to a driving lane of a vehicle within a traffic scene;
computing, using a second model, relevancy scores for the traffic lights according to geometric inferences between the depth, the orientation information, and the location information, and the geometric inferences represent the orientation information as an angular relationship between the vehicle within the driving lane and the traffic lights;
assigning, using the second model, a primary relevancy score from the relevancy scores for a light of the traffic lights associated with the driving lane according to the depth and the orientation information; and
executing a control task by the vehicle according to the primary relevancy score and a state confidence, computed by the first model, for the light.

15. The method of claim 14, wherein assigning the primary relevancy score further includes assigning, using the second model, a secondary relevancy score for another light of the traffic lights in an adjacent lane to the vehicle substantially independent of map data.

16. The method of claim 14, wherein the state confidence indicates probabilities of a color and a shape for the light of the traffic lights.

17. The method of claim 14, wherein estimating of the depth further includes determining, using the first model, a geometric representation of the traffic scene with the image, the depth, the orientation, and the location information independent of map data, and the state confidence represents probabilities for characteristics associated with the traffic lights.

18. The method of claim 17, wherein the angular relationship is between the light and the vehicle relative to an adjacent lane.

19. The method of claim 14, wherein the primary relevancy score is assigned substantially independent of map data for the traffic lights and the driving lane.

20. The method of claim 14, wherein the image is captured by a monocular camera of a single view for the traffic lights.

* * * * *